No. 687,808. Patented Dec. 3, 1901.
L. W. WITRY.
FRICTION CLUTCH.
(Application filed June 11, 1901.)
(No Model.) 2 Sheets—Sheet 1.

WITNESSES: INVENTOR
Louis W. Witry
BY
G. C. Kennedy,
ATTORNEY

No. 687,808. Patented Dec. 3, 1901.
L. W. WITRY.
FRICTION CLUTCH.
(Application filed June 11, 1901.)

(No Model.) 2 Sheets—Sheet 2.

WITNESSES:

INVENTOR
Louis W. Witry
BY
G. C. Kennedy
ATTORNEY

UNITED STATES PATENT OFFICE.

LOUIS W. WITRY, OF WATERLOO, IOWA.

FRICTION-CLUTCH.

SPECIFICATION forming part of Letters Patent No. 687,808, dated December 3, 1901.

Application filed June 11, 1901. Serial No. 64,124. (No model.)

*To all whom it may concern:*

Be it known that I, LOUIS W. WITRY, a citizen of the United States of America, and a resident of the city of Waterloo, Blackhawk county, Iowa, have invented certain new and useful Improvements in Friction-Clutches, of which the following is a specification.

My invention relates to improvements in friction-clutches for shafting; and the objects of my improvements are to simplify the construction by reducing the number of the parts and by so arranging the parts that they will occupy but the minimum of space upon the shaft. I attain these objects by the mechanism illustrated in the accompanying drawings, in which—

Figure 1:
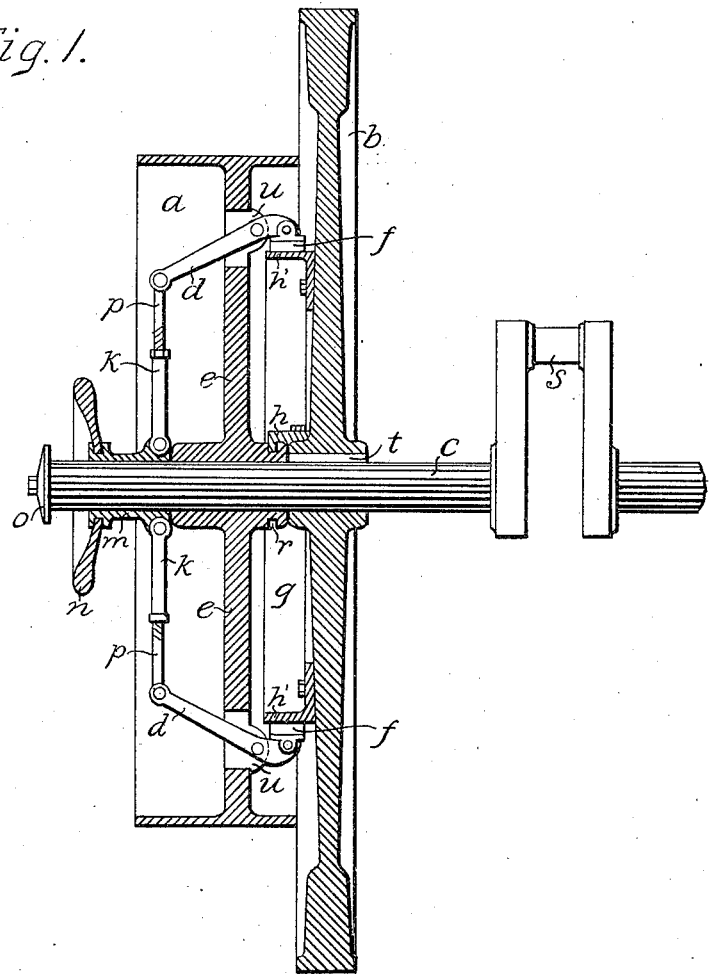
Figure 2:
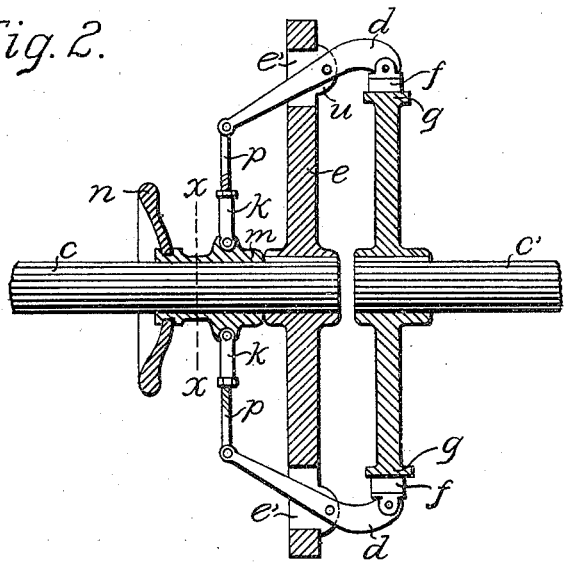

Figure 1 is a longitudinal central section of a pulley and fly-wheel equipped with my improved friction-clutch. Fig. 2 is a vertical section showing my clutch mechanism arranged for connecting a driving with a driven shaft, and Fig. 3 is an elevation of the same.

My invention is adapted especially for use on gasolene traction and portable engines, where it is desirable that the crank-shaft should be of limited length.

The crank-shaft $c\,s$ has a fly-wheel $b$ keyed upon it at $t$. The pulley $a$ and the sleeve $m$ are both revoluble about the said shaft. A flanged plate $h$ is attached to the hub of the fly-wheel $b$, its flange extending into a groove in the hub of the pulley $a$ in order to prevent the pulley from sliding lengthwise upon the shaft. A sleeve $m$ is placed about the shaft between the pulley $a$ and the cap $o$ and is revoluble thereon, enough clear space being left between the sleeve and the cap to allow the sleeve to move a suitable distance lengthwise upon the shaft. The sleeve $m$ is provided with a hand-wheel $n$, revoluble about it in a groove $r$, cut in its outer periphery. A ring $g$, having a rim $h'$, is bolted to the spokes on the outside of the fly-wheel $b$. The inner ends of the levers $d$ are pivoted to the friction-shoes $f$. Said levers are fulcrumed at points near their inner ends to lugs $u$ on the spokes of the pulley $a$. Said levers pass through the slots $e'$, extending outwardly, their outer ends being pivoted to the two-part links $p\,k$. The sections $p$ of the two-part links are threaded at their inner ends to engage nuts on the sections $k$ in order that proper adjustment may be made of the parts to take up slackness occasioned by wear. The sections $k$ are pivoted to lugs on the sleeve $m$. Friction-shoes $f$ are pivoted to the inner ends of the levers $d$, arranged to engage and bear against the outer peripheral surface of the rim $h'$ of the ring $g$. As the sleeve $m$ is pushed in toward the pulley $a$ the friction-shoe $f$ engages the rim $h'$, bearing against it, bringing said pulley into rotation. When by means of the hand-wheel $n$ the sleeve $m$ is drawn outwardly along the shaft $c$, the two-part links $p\,k$ depress the outer ends of the levers $d$, raising the inner ends of said levers and the friction-shoes $f$ away from the rim $h'$, causing the pulley to lose its motion.

Figure 3:
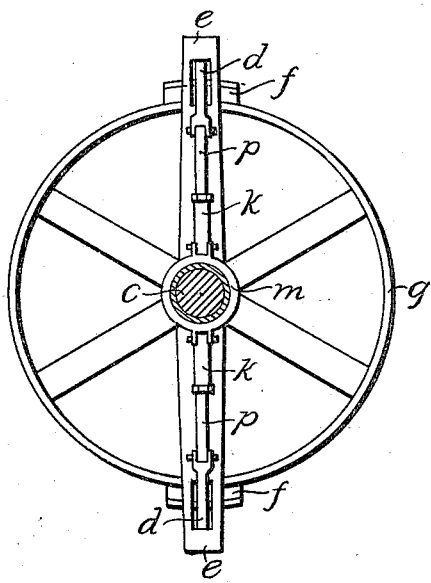

In Figs. 2 and 3 I have shown a driven shaft $c'$ connected to a driving-shaft $c$ by means of my improved friction-clutch. Bearing-arms $e\,e$ are fastened to the driving-shaft $c$ and carry the levers $d\,d$, supporting the friction-shoes $f\,f$, which engage the outer periphery of the rim of a wheel $g$, which latter is keyed to the driven shaft $c'$. The operation thereof is similar to that of the clutch shown in Fig. 1, except that motion is communicated from the driving-shaft $c$ through the bearing-arms $e\,e$ to the shaft $c'$ through the wheel $g$.

What I claim as new, and desire to secure by Letters Patent, is—

In a friction-clutch, the combination of a shaft, a fly-wheel rigidly connected to said shaft, a pulley revoluble on said shaft, a flanged plate fastened to the hub of said fly-wheel and engaging a groove in the outer periphery of the hub of said pulley, a ring having a flanged rim bolted to the outer surface of the spokes of said fly-wheel, friction-shoes adapted to engage the outer peripheral surface of the rim of said ring, levers fulcrumed in lugs on the inner sides of the spokes of said pulley and passed through slots in the said spokes, adjustable two-part links connecting the outer ends of said levers with a sleeve on said shaft, a sleeve mounted revolubly on said shaft and movable lengthwise upon it, and a hand-wheel mounted in a groove in said sleeve and revoluble about it, substantially as shown and described.

Signed by me at Waterloo, Iowa, this 7th day of June, 1901.

LOUIS W. WITRY.

Witnesses:
GEO. R. TURNER,
HALEON G. TURNER.